(12) United States Patent
Koh et al.

(10) Patent No.: US 9,203,105 B2
(45) Date of Patent: Dec. 1, 2015

(54) RECHARGEABLE BATTERY

(75) Inventors: Seok Koh, Yongin-si (KR); Kyungho Park, Yongin-si (KR); Jeongdeok Byun, Yongin-si (KR); Eunok Kwak, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 694 days.

(21) Appl. No.: 12/213,194

(22) Filed: Jun. 16, 2008

(65) Prior Publication Data

US 2009/0117412 A1    May 7, 2009

(30) Foreign Application Priority Data

Nov. 7, 2007  (KR) .......................... 10-2007-0113061

(51) Int. Cl.
| | |
|---|---|
| *H01M 2/06* | (2006.01) |
| *H01M 2/22* | (2006.01) |
| *H01M 2/26* | (2006.01) |
| *H01M 2/04* | (2006.01) |
| *H01M 10/42* | (2006.01) |
| *H01M 2/20* | (2006.01) |
| *H01M 10/052* | (2010.01) |

(52) U.S. Cl.
CPC .......... *H01M 10/052* (2013.01); *H01M 2/0473* (2013.01); *H01M 2/06* (2013.01); *H01M 2/22* (2013.01); *H01M 2/26* (2013.01); *H01M 10/425* (2013.01); *H01M 2/04* (2013.01); *H01M 2/0404* (2013.01); *H01M 2010/4271* (2013.01); *H01M 2200/00* (2013.01); *Y02E 60/122* (2013.01)

(58) Field of Classification Search
CPC ........... H01M 2/06; H01M 2/22; H01M 2/26; H01M 2/04; H01M 2/0473; H01M 10/425; H01M 10/4257; H01M 2010/4271; H01M 2/0404; H01M 2/20; H01M 2200/00
USPC ............................. 423/7, 161, 175, 178, 179
See application file for complete search history.

(56) References Cited

U.S. PATENT DOCUMENTS

| | | | |
|---|---|---|---|
| 5,977,746 A * | 11/1999 | Hershberger et al. | 320/112 |
| 2003/0082441 A1* | 5/2003 | Hovi et al. | 429/123 |
| 2004/0091769 A1* | 5/2004 | Kawabata et al. | 429/163 |
| 2005/0153195 A1* | 7/2005 | Han | 429/59 |
| 2005/0208345 A1* | 9/2005 | Yoon et al. | 429/7 |
| 2006/0099492 A1* | 5/2006 | Jeon | 429/61 |
| 2006/0251930 A1* | 11/2006 | Kim | 429/7 |
| 2008/0102356 A1* | 5/2008 | Choi | 429/122 |

FOREIGN PATENT DOCUMENTS

| | | |
|---|---|---|
| KR | 10-2005-0077744 A | 8/2005 |
| KR | 10-0645256 | 11/2006 |

\* cited by examiner

*Primary Examiner* — Eugenia Wang
(74) *Attorney, Agent, or Firm* — Robert E. Bushnell, Esq.

(57) ABSTRACT

In a rechargeable battery, a case is combined with an upper surface of a bare cell by being fixed to a lead plate electrically coupling a protection circuit board of a protection circuit module to the bare cell. Alternatively, the case is combined with the bare cell by being fixed to the protection circuit board so as not to be separated from the bare cell, thereby improving the reliability of the products.

10 Claims, 7 Drawing Sheets

RECHARGEABLE BATTERY

CLAIM OF PRIORITY

This application makes reference to, incorporates the same herein, and claims all benefits accruing under 35 U.S.C. §119 from an application earlier filed in the Korean Intellectual Property Office on the 7$^{th}$ of Nov. 2007, and there duly assigned Ser. No. 10-2007-0113061.

BACKGROUND OF THE INVENTION

1. Technical Field

The present invention relates to a rechargeable battery and, more particularly, to a rechargeable battery which can improve productivity by improving an assembly structure of the battery.

2. Related Art

Generally, a rechargeable battery is a battery which is rechargeable and is different from a disposable battery which is not rechargeable. The rechargeable battery has been widely used in the fields of electronic devices, such as cellular phones, notebook computers and camcorders. Particularly, a lithium rechargeable battery has an operational voltage of 3.6V which is three times higher than that of an Ni—Cd battery or an Ni—H battery, which are frequently used as power sources of electronic devices, and which have high energy density per unit weight. As a result, the lithium-ion battery has developed rapidly in recent years.

The lithium rechargeable battery includes a bare cell and a protection circuit module (PCM) for electrically protecting the operation of the bare cell. The bare cell comprises an electrode assembly including a cathode plate, an anode plate and a separator interposed between them, a can receiving the electrode assembly and an electrolytic solution, and a cap assembly sealing an opening part of the can.

Methods of fixing the protection circuit module to the bare cell include a molding method using injected melted resin and an assembling method using an injection molded case.

The method of fixing the protection circuit module to the bare cell by molding melted resin has a problem in that the high temperature of the melted resin causes undesirable effects on various elements included in the protection circuit module. Furthermore, it is difficult to form a molding resin at an exact position on one surface of the bare cell, thereby increasing defects.

Conversely, the method of fixing the protection circuit module to the bare cell by the injection molded case does not affect the elements of the protection circuit module by hot temperature, and since it is an assembling method using a case, it is always possible to assemble at an exact position of the bare cell. In addition, the assembling process is simple.

However, in the fixing method using the case, the case is fixed to the bare cell by a label sheet surrounding an outer circumference surface of the bare cell. In this regard, the case is fixed to the bare cell by adhesive force of the label sheet, which is a thin film, and thus the binding force of the case attached to the bare cell is very weak. Accordingly, the case is easily twisted from an upper surface of the bare cell or, in an undesirable case, may be separated from the bare cell.

As described above, the conventional case is easily separated from the bare cell because the case is fixed to the bare cell only by the adhesive force of the label sheet. Thus, there is a problem that the reliability of products is prominently damaged.

SUMMARY OF THE INVENTION

Accordingly, an object of the present invention is to provide a rechargeable battery which can strongly fix a case to a bare cell so as not to be separated from the bare cell.

Additional advantages, objects and features of the invention will be set forth, in part, in the following description, and will become apparent, in part, to those having ordinary skill in the art upon examination of the following or may be learned from practice of the invention.

According to an aspect of the present invention, a rechargeable battery comprises: a bare cell; a protection circuit module including a protection circuit board installed in the bare cell; a lead plate installed between the protection circuit board and the bare cell so as to electrically couple the protection circuit board and the bare cell; and a case connected to the bare cell so as to receive the protection circuit module on one surface of the bare cell; wherein at least one projection is formed on the lead plate and a projection fixing part combined with the projection is formed at the case so as to combine the case with the bare cell.

The lead plate may be installed on both ends of an upper surface of a cap plate of the bare cell, and includes a substrate fixing part welded to the protection circuit board and a bare cell fixing part welded to the bare cell, and the projection may be formed horizontally and outwardly from a side surface of the bare cell fixing part.

The lead plate may be fixed by laser-welding the bare cell fixing part to the upper surface of the cap plate.

The projection fixing part of the case may be formed in the shape of a hole or a groove.

The case may include a sleeve covering an outer circumferential surface of an upper periphery of the bare cell, the sleeve being extended at its lower end part, and the projection fixing part may be formed on the sleeve.

A label sheet may be attached to a side surface of the bare cell so as to cover the sleeve of the case.

According to another aspect of the present invention, a rechargeable battery comprises: a bare cell; a protection circuit module including a protection circuit board installed in the bare cell; and an upper case connected to the bare cell while receiving the protection circuit module on one surface of the bare cell; wherein at least one projection is formed on the protection circuit board, and a projection fixing part combined with the projection is formed at the case so as to hold the case by means of the bare cell.

The projection of the protection circuit board is projected horizontally and outwardly from a side surface of the protection circuit board.

The projection fixing part of the upper case may be formed in the shape of a hole or a groove.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF THE INVENTION

Figure 1:
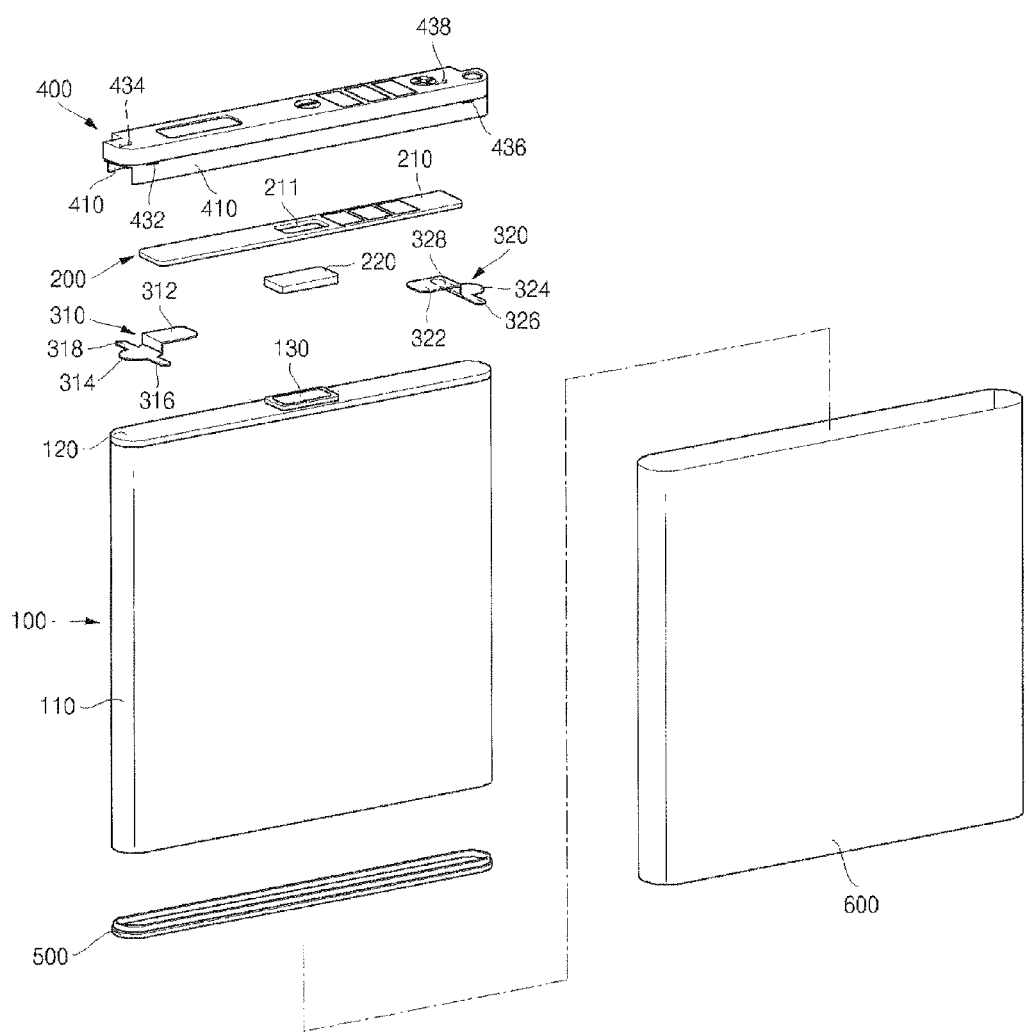
FIG. 1 is an exploded perspective view of a rechargeable battery according to a first exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
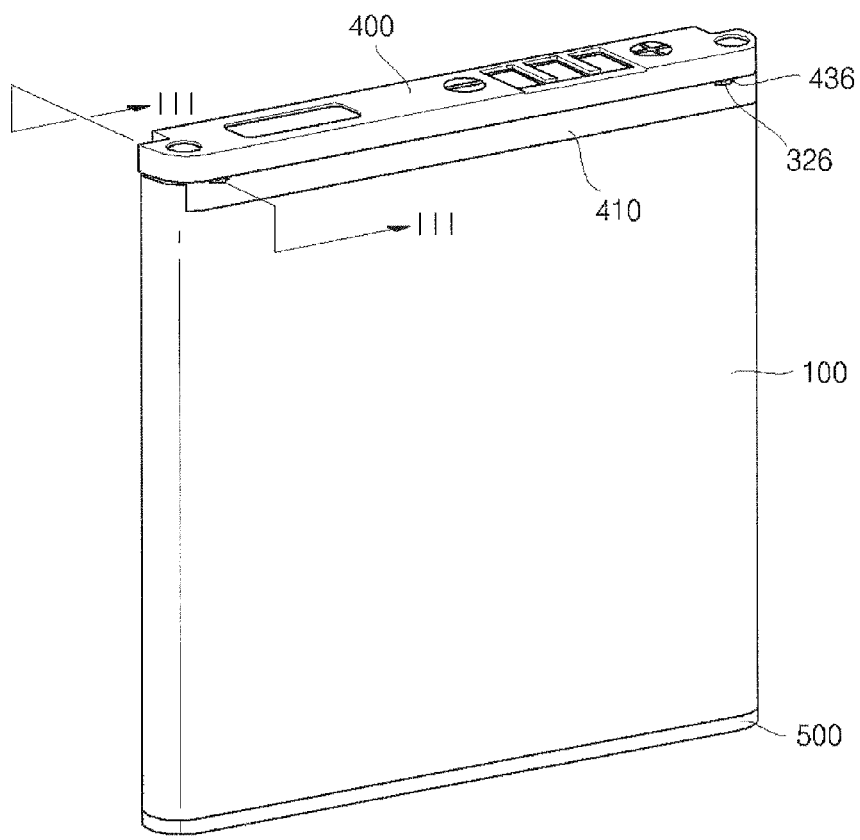
FIG. 2 is a perspective view of a state wherein an upper case of the rechargeable battery according to the first exemplary embodiment of the present invention is combined.
Figure 3:
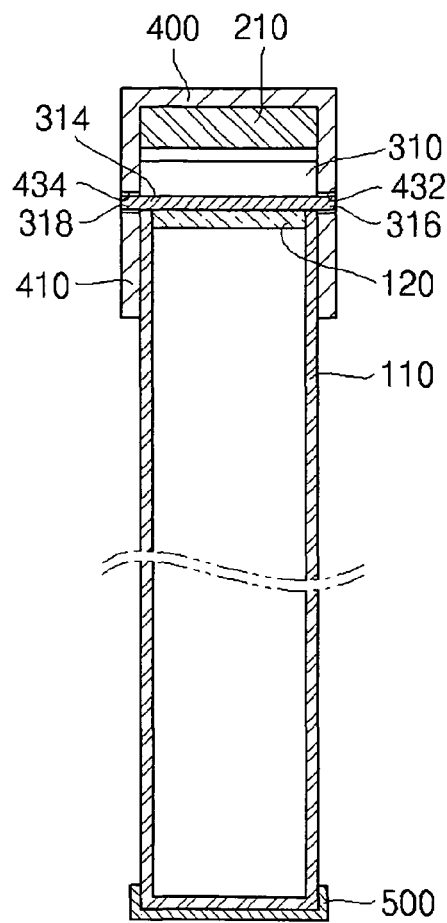
FIG. 3 is a sectional view taken along line III-III of FIG. 2.
Figure 4:
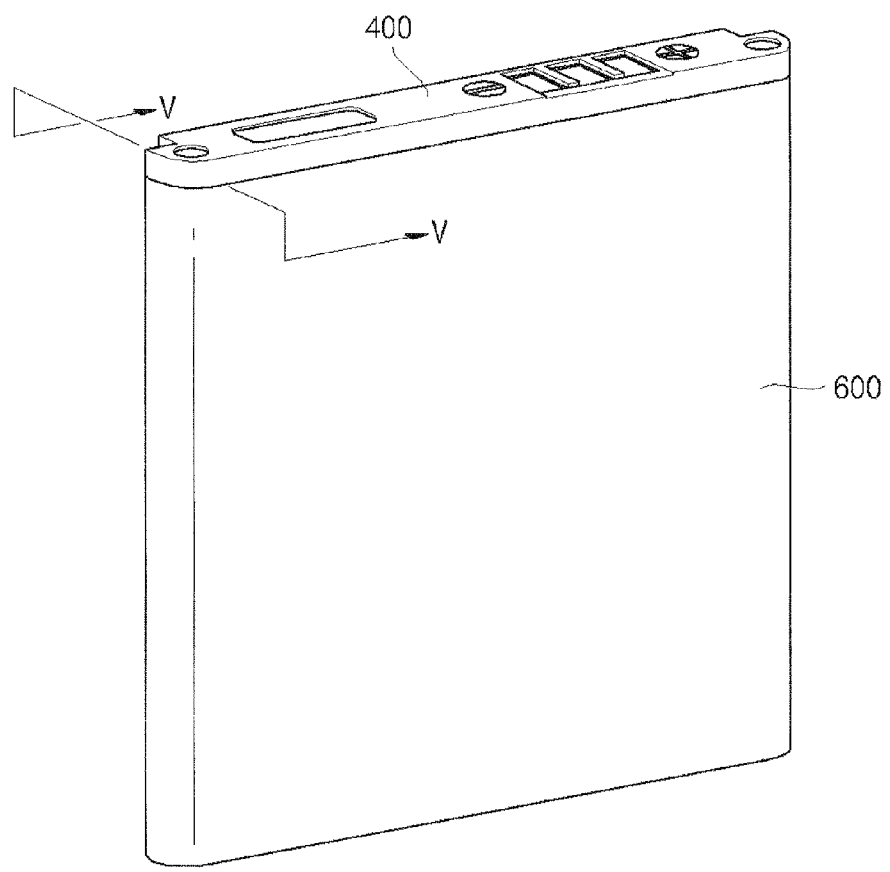
FIG. 4 is a perspective view of a state wherein a label sheet according to the first exemplary embodiment is attached.
Figure 5:
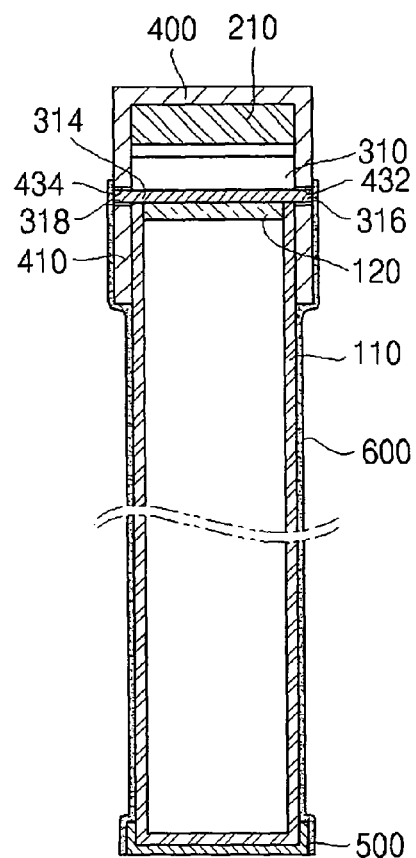
FIG. 5 is a sectional view taken along line V-V of FIG. 4.

FIG. 1 is an exploded perspective view of a rechargeable battery according to a first exemplary embodiment of the present invention, FIG. 2 is a perspective view of a state wherein an upper case of the rechargeable battery according to the first exemplary embodiment of the present invention is combined, FIG. 3 is a sectional view taken along line III-III of FIG. 2, FIG. 4 is a perspective view of a state wherein a label sheet according to the first exemplary embodiment is attached, and FIG. 5 is a sectional view taken along line V-V of FIG. 4.

Referring to FIGS. 1 thru 5, the rechargeable battery includes a bare cell 100, a protection circuit module 200 arranged on one surface of the bare cell 100, and an upper case 400 covering the protection circuit module 200. The protection circuit module 200 further includes a protection circuit board 210, and the bare cell 100 and the protection circuit module 200 are electrically coupled to each other by lead plates 310 and 320.

The upper case 400 is fixed by the lead plates 310 and 320 so as to be combined with the bare cell 100.

A lower case 500 is installed on a lower surface of the bare cell 100, and a label sheet 600 is wound and attached on a side surface of the bare cell 100.

The bare cell 100 includes an electrode assembly (not shown) comprising a cathode plate, an anode plate and a separator, a can 110 receiving the electrode assembly and an electrolytic solution, a cap assembly (not shown) including a cap plate 120 for sealing an opening part of the can 110, and an electrode terminal 130 passing through the cap plate 120 so as to connect the electrode terminal 130 to an electrical terminal (not shown) of the protection circuit board 210.

The protection circuit module 200 is composed of various electronic devices (not shown) installed on the protection circuit board 210. A through-hole 211 is formed in a middle part of the protection circuit board 210, and an electrical terminal connected to the electrode terminal 130 is horizontally installed in parallel with the cap plate 120 and through the through-hole 211.

The lead plates 310 and 320 are installed on respective ends of the upper surface of the cap plate 120. The lead plates 310 and 320 are welded to the protection circuit board 210 and cap plate 120 so as to electrically couple them to each other. Substrate fixing parts 312 and 322 of the lead plates 310 and 320, respectively, are welded to the protection circuit board 210, and bare cell fixing parts 314 and 324 are welded to the bare cell 100. The substrate fixing parts 312 and 322 are formed by bending upper parts of the lead plates 310 and 320, respectively, and the bare cell fixing parts 314 and 324 are formed by bending lower parts of the lead plates 310 and 320, respectively. The lead plates 310 and 320 are fixed by laser-welding the bare cell fixing parts 314 and 324, respectively, to the upper surface of the cap plate 120.

The electrode terminal 130 of the bare cell 100 is electrically coupled to the electrical terminal 220 of the protection circuit board 210. Furthermore, another electrical terminal (not shown) of the protection circuit board 210 is connected to the bare cell by the lead plates 310 and 320. In this regard, when the electrode terminal 130 of the bare cell 100 is connected to the electrical terminal 220 with negative polarity, another electrical terminal of the protection circuit board 210 has positive polarity.

The upper case 400 is combined with the upper part of the bare cell 100 so as to receive the protection circuit board 210. At this point, the upper case 400 is fixed by the lead plates 310 and 320.

The upper case 400 is fixed by projections 316, 318, 326 and 328 formed on the lead plates 310 and 320, respectively, and projection fixing holes 432, 434, 436 and 438 formed on the upper case 400.

The projections 316, 318, 326 and 328 are horizontally projected from both side surfaces of the bare cell fixing parts 314 and 324 of the lead plates 310 and 320. However, the projections 316, 318, 326 and 328 may be formed on at least one side surface of the bare cell fixing parts 314 and 324. In the case where the projections are formed on any one side surface, it is desirable that when the projection 316 is formed on one side surface of one lead plate 310, the projection 328 be formed on the opposite side surface of the other lead plate 320. This is the reason that it is desirable to fix the upper case 400 by forces simultaneously acting in directions facing each other.

The projection fixing holes 432, 434, 436 and 438 are formed on an upper end of the sleeve 410 of the upper case 400 so as to pass through the sleeve 410.

Thus, when the upper case 400 is combined with the upper part of the bare cell 100, the projections 316, 318, 326 and 328 are inserted into the projection fixing holes 432, 434, 436 and 438, respectively, of the upper case 400. Accordingly, the upper case 400 is fixed by the lead plates 310 and 320.

When the upper case 400 is fixed by the lead plates 310 and 320, a label sheet 600 surrounding the side surface of the bare cell 100 is attached. The label sheet 600 is attached so as to cover the sleeve 410 extended at both lower ends of the upper case 400. Accordingly, the label sheet 600 is attached so as to cover the projection fixing holes 432, 434, 436 and 438, thereby preventing the projection fixing holes 432, 434, 436 and 438 from being exposed to the outside.

On the other hand, lower case 500 may be attached to the lower surface of the bare cell 100 by adhesive or the like. The lower case 500 is combined with a lower surface of the can 110 so as to protect the bare cell 100 from external impacts.

Figure 6:
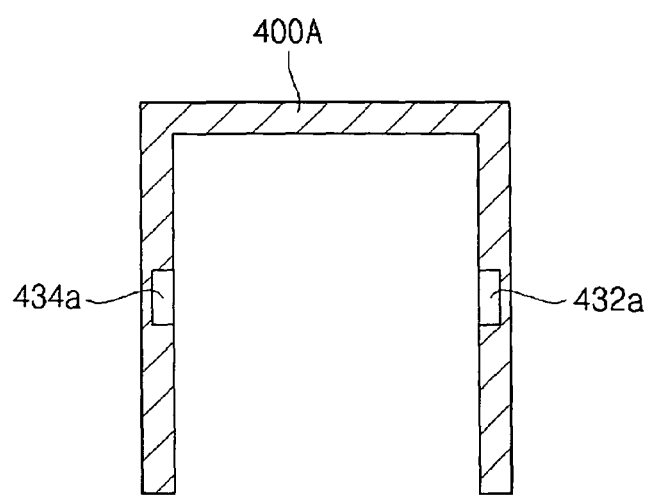
FIG. 6 is a sectional view of the upper case of the rechargeable battery according to a second exemplary embodiment of the present invention.

FIG. 6 is a sectional view of the upper case according to a second exemplary embodiment of the present invention.

Referring to FIG. 6, projection fixing parts may be formed in the shape of a groove on the upper case. That is, projection fixing grooves 432a and 434a are formed inside the upper case 400A and thus, projections can be inserted into the upper case 100A and fixed by the projection fixing grooves 432a and 434a.

When the projection fixing parts are formed in the shape of groove, it is possible to cover the projections 316, 318, 326 and 328 formed on the lead plates 310 and 320 so as not to be exposed to the outside. Accordingly, even if the label sheet 600 is not attached, the appearance of the rechargeable battery becomes good because the projections 316, 318, 326 and 328 are not exposed to the outside.

Figure 7:
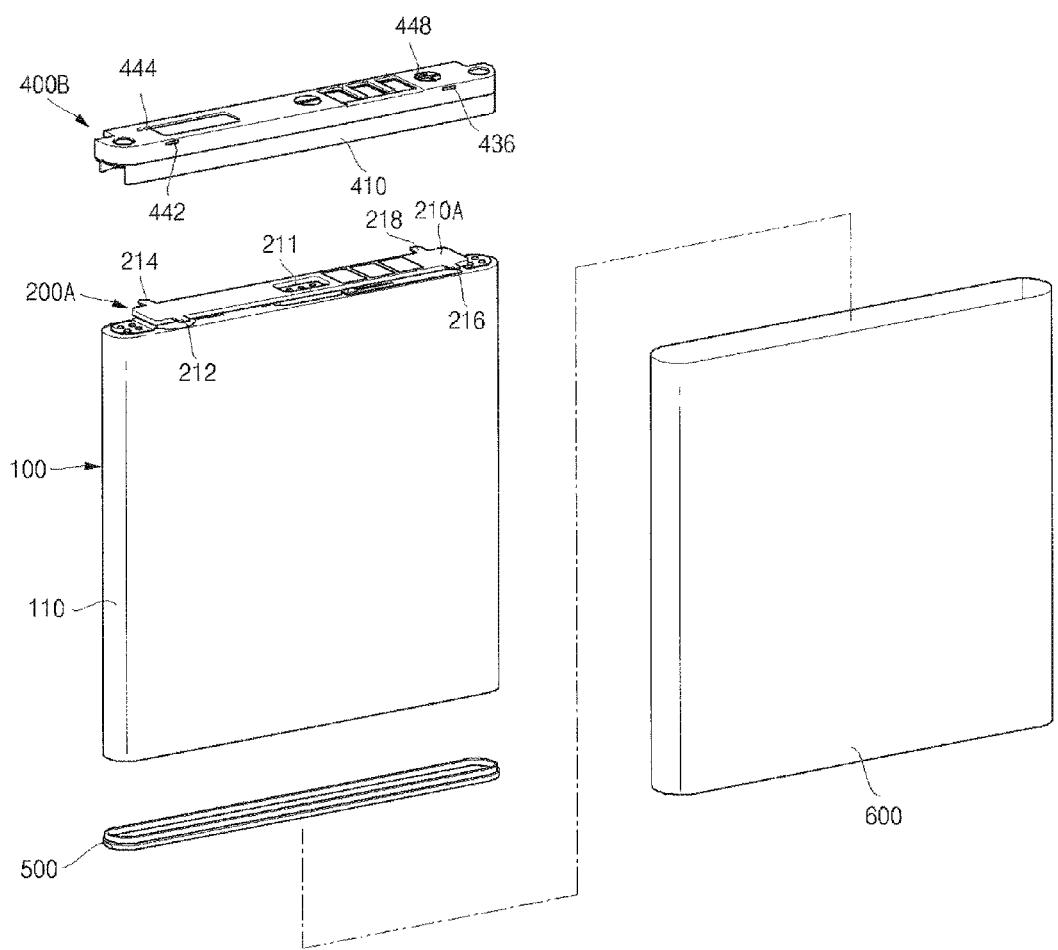
FIG. 7 is an exploded perspective view of a bare cell and the upper case according to a third exemplary embodiment of the present invention.
Figure 8:
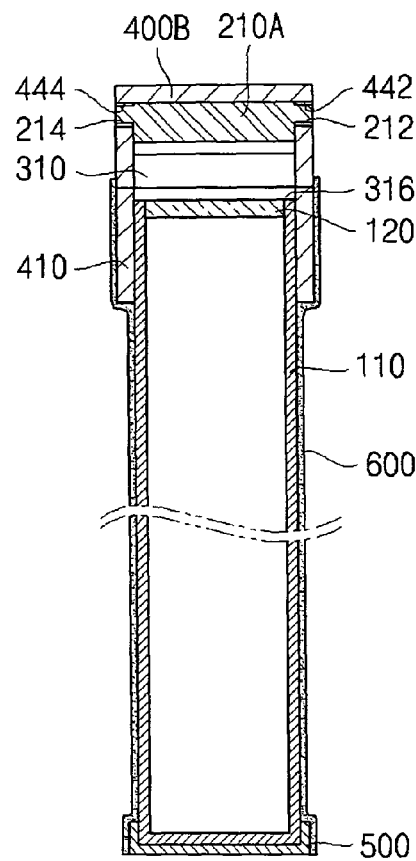
FIG. 8 is a sectional view of a state wherein a label sheet according to the third exemplary embodiment is attached.

FIG. 7 is an exploded perspective view of a bare cell and the upper case according to a third exemplary embodiment of the present invention, and FIG. 8 is a sectional view of a state wherein a label sheet according to the third exemplary embodiment is attached.

In the third embodiment, the same drawing reference numerals are used for the same elements.

Referring to FIGS. 7 and 8, in the rechargeable battery, projections for holding by fixing an upper case 400B to a bare cell 100 are formed on a protection circuit board 210A.

Projections 212, 214, 216 and 218 are respectively formed on both side surfaces of front and rear parts of the protection circuit board 210A outwardly and horizontally. Furthermore, projection fixing holes 442, 444, 446 and 448 are respectively formed at positions of the upper case 400B corresponding to the projections 212, 214, 216 and 218 of the protection circuit board.

In the rechargeable battery constituted as described above, in the process wherein the upper case 400B is assembled on the upper part of the bare cell 100, the projections 212, 214, 216 and 218 of the protection circuit board 210A are inserted into the projection fixing holes 442, 444, 446 and 448 of the case 400B. Thus, the case 400B is fixed to the protection circuit board 210A so as not to be separated from the upper part of the bare cell 100.

After the upper case 400B is assembled, a label sheet 600 may be attached on an outer surface of the bare cell 100. The label sheet 600 is attached so as to cover a sleeve 410 extended at left and right peripheral sides of a lower end of the case 400B, thereby providing a binding force to maintain the upper case 400B fixed to the bare cell 100.

Figure 9:
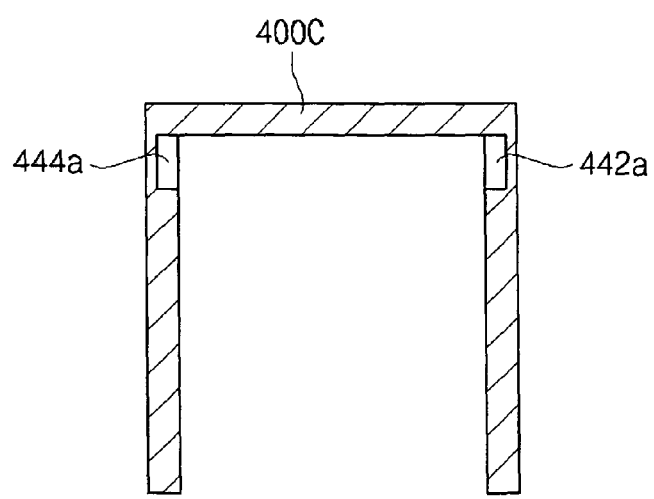
FIG. 9 is a sectional view of an upper case according to a fourth exemplary embodiment.

FIG. 9 is a sectional view of the upper case according to a fourth exemplary embodiment.

Referring to FIG. 9, the projection fixing part of the upper case may be formed in the shape of a groove. That is, projection fixing grooves 442a and 444a are formed inside an upper case 400C, and thus projections can be inserted into and fixed by the projection fixing grooves 442a and 444a.

When the projection fixing parts are formed in the shape of groove as described above, the projections 212, 214, 216 and 218 formed on the protection circuit board 210A are not exposed to the outside of the upper case 400C. Accordingly, the appearance of the rechargeable battery becomes good.

As described above, the rechargeable battery according to the present invention produces the following effects.

First, the case is stably fixed to the bare cell so as not to be separated from the bare cell, thereby improving reliability of products.

Second, the case is fixed by the projection formed on the lead plate, thereby improving the binding force of the case to the bare cell.

Third, the projections are inserted into the projection fixing grooves so as not to be exposed to the outside of the case, thereby allowing the appearance to be good.

Fourth, the case is fixed by a projection formed on the protection circuit board, thereby improving the binding force which binds the case to the bare cell.

It should be understood by those of ordinary skill in the art that various replacements, modifications and changes in the form and detail may be made therein without departing from the spirit and scope of the present invention as defined by the following claims. Therefore, it is to be appreciated that the above described embodiments are for purposes of illustration only and are not to be construed as limitations of the invention.

What is claimed is:

1. A rechargeable battery, comprising:
a bare cell which includes an electrode terminal and a cap plate;
a protection circuit module including a protection circuit board installed in the bare cell and electrically connected to the electrode terminal;
a lead plate, installed between the protection circuit board and the cap plate to electrically couple the protection circuit board and the cap plate; including
a substrate fixing part having a major flat surface directly coupled to the protection circuit board,
a bare cell fixing part having a major flat surface directly coupled to the cap plate, and
a connecting part having one end directly connected to the bare cell fixing part and another end directly connected to the substrate fixing part so that the substrate fixing part does not directly face the bare cell fixing part;
a case connected to the bare cell so as to receive the protection circuit module on a surface of the bare cell,
at least one projection is formed from a side surface of the bare cell fixing part of the lead plate to extend outwardly in a major plane of the bare cell fixing part,
a projection fixing part formed at the case and combining the case with the bare cell by receiving said at least one projection.

2. The rechargeable battery of claim 1, wherein the lead plate is fixed by laser-welding the bare cell fixing part to the major flat surface of the cap plate facing outside of the bare cell.

3. The rechargeable battery of claim 1, wherein the projection fixing part comprises a hole.

4. The rechargeable battery of claim 1, wherein the projection fixing part is a groove.

5. The rechargeable battery of claim 1, wherein the case comprises a sleeve extending from an end of the case and covering an outer circumferential surface, and the projection fixing part is formed on the sleeve.

6. The rechargeable battery of claim 5, further comprising a label sheet is attached to a major outer circumferential surface of the bare cell to cover the sleeve.

7. A rechargeable battery, comprising:
a bare cell which includes an electrode terminal and a cap plate;
a protection circuit module including a protection circuit board installed in the bare cell and electrically connected to the electrode terminal and the cap plate; and
a case connected to a portion of the bare cell, the case including the cap plate and receiving the protection circuit module on one surface of the bare cell, the case comprising a sleeve covering an outer circumferential surface of a periphery of the bare cell including the cap plate, the case being extended beyond the outer circumferential surface of the periphery of the bare cell, at least one projection formed outwardly in a major plane of the protection circuit board from a side surface of the protection circuit board including a lead plate connecting the protection circuit board and the bare cell, the lead plate including
- a substrate fixing part formed by bending a first end of the lead plate and directly coupled to the protection circuit board,
- a bare cell fixing part formed by bending a second end of the lead plate in an opposite direction and directly coupled the second end of the lead plate to the bare cell, and
- a connecting part directly connecting the substrate fixing part and the bare cell fixing part, and a projection fixing part formed at the case and on the sleeve, and combining the case with the bare cell by receiving said at least one projection.

8. The rechargeable battery of claim 7, wherein the projection fixing part is a hole.

9. The rechargeable battery of claim 7, wherein the projection fixing part is a groove.

10. A rechargeable battery, comprising:
a bare cell which includes an electrode terminal and a cap plate;
a protection circuit module including a protection circuit board installed in the bare cell and electrically connected to the electrode terminal;
two one-piece lead plates, installed between the protection circuit module and the cap plate to electrically couple the protection circuit module and the cap plate,
each of the lead plates comprising
- a substrate fixing part formed by bending a first end of the lead plate and directly coupled to the protection circuit board,
- a bare cell fixing part formed by bending a second end of the lead plate in an opposite direction and directly coupling the second end of the lead plate to the bare cell, and
- a connecting part directly connecting the substrate fixing part and the bare cell fixing part;

a case connected to the bare cell to receive the protection circuit module on a surface of the bare cell;

at least one projection is formed on the lead plate except the connecting part and the substrate fixing part;

a projection fixing part is formed at the case and is connected to said at least one projection for combining the case with the bare cell;

each of the lead plates is installed on one of both ends of the cap plate, which are separated along a lengthwise direction of a major flat surface of the cap plate facing outside of the bare cell, and said at least one projection is formed outwardly in a same major plane of the bare cell fixing part from a side surface of the bare cell fixing part.

* * * * *